Patented May 19, 1942

2,283,458

UNITED STATES PATENT OFFICE 2,283,458

PROCESS FOR MAKING RESINOUS CONDENSATION PRODUCTS

Max Phillips, Washington, D. C., dedicated to the free use of the People of the United States of America No Drawing. Application January 10, 1940, Serial No. 313,219

4 Claims. (Cl. 260—10)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people of the United States of America to take effect on the granting of a patent to me.

Structurally, higher plants may be said to be composed chiefly of cellulose, hemicelluloses and lignin. While cellulose is used extensively industrially, the hemicelluloses are used to a limited extent only for the production of furfural. I have found that under suitable conditions hemicelluloses may be condensed with phenols and resinous condensations obtained which have desirable plastic properties.

Examples of the manner in which this invention may be practiced are given immediately following, but it is to be understood that I do not limit myself to any particular temperature, catalyst, phenolic substance or to any special hemicellulose preparation.

Example.—To 20 parts of phenol a small quantity of con. sulfuric acid is added to serve as catalyst and the mixture heated to 100–125° C., and ten parts of hemicelluloses are then added portionwise with stirring. The reaction mixture is then heated under a reflux condenser to its boiling temperature and maintained at that temperature for substantially one-half hour. The excess phenol is then removed, preferably by distillation in vacuo, and the hot condensation product poured. The condensation product obtained is of dark-brown color, and is thermoplastic. When ground to a powder it has a dark-reddish tinge to it. This material when cold may be ground and mixed with a suitable filler such as wood flour and moulded under heat and pressure.

While in the above example phenol was used, other phenols such as the cresols, naphtols, halogenated phenols, etc., or mixtures of phenols obtained in the dry distillation of coal, lignin or of woody materials, may be used. Hydrochloric, hydrobromic, and phosphoric acids may also be used in place of the sulfuric acid. The temperatures given in the above example are not critical and it is to be understood that this invention is not limited to these temperatures. A temperature at or above the boiling point of the particular phenolic-hemicellulosic mixture used may be employed.

Having thus described my invention, what I claim for Letters Patent is:

I claim:

1. A process of making a resinous condensation product, comprising heating hemicelluloses with a phenol as the only reactants in the presence of a catalyst.

2. A process of making a resinous condensation product, comprising heating hemicelluloses with a mixture of phenols as the only reactants in the presence of an acid catalyst.

3. A process of making a resinous condensation product, comprising subjecting hemicelluloses and phenol as the only reactants to the action of heat ranging from 100–125° C. in the presence of an acid catalyst, the while agitating the mass; thence subjecting the reaction mixture to the action of heat at its boiling temperature for substantially one-half hour; thence removing the excess phenol, and recovering the condensation product; thence allowing the condensation product to cool, and thence grinding.

4. A new composition of matter resulting by the condensation of hemicelluloses with phenolic substances as the only reactants.

MAX PHILLIPS.